April 23, 1957  J. ROINESTAD  2,789,850

DOOR CATCH

Filed Dec. 15, 1953

Joseph Roinestad
INVENTOR.

BY *Clarence A. O'Brien*
*and Harvey B. Jacobson*
Attorneys

United States Patent Office 2,789,850
Patented Apr. 23, 1957

2,789,850

DOOR CATCH

Joseph Roinestad, Atascadero, Calif., assignor of one-fourth to Fred A. Shaeffer, Santa Maria, Calif.

Application December 15, 1953, Serial No. 398,347

1 Claim. (Cl. 292—76)

The present invention relates to new and useful improvements in door catches for cabinets or the like.

An important object of the invention is to provide a two-part catch including a female part composed of a pair of resilient jaws anchored in a cabinet to receive a male part composed of a headed stud anchored to a door to secure the door in closed position.

Another object of this invention is to provide a catch composed of co-acting resilient jaws projecting from the front edge of a pair of plates, which are in confronting relation to each other and fitted edgewise in a saw cut in the front edge of a shelf to anchor the catch thereto without the use of screw or other fasteners.

A further object of the invention is to provide a device of this character of simple and practical construction, which is efficient and reliable in operation, relatively inexpensive to manufacture, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
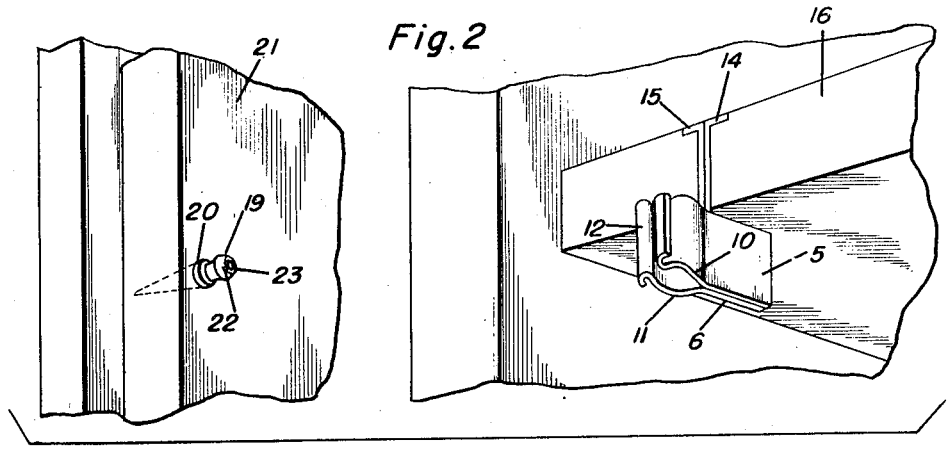
Figure 2 is a group perspective view.

Referring now specifically to the drawings in detail, wherein for the purpose of illustration I have disclosed a preferred embodiment of my invention, the numerals 5 and 6 designate a pair of metal plates of elongated shape which may be welded or otherwise secured to each other in confronting relation.

Tongues 7 and 8 project from one longitudinal edge of the plates adjacent one end thereof and with the opposing faces of the tongues recessed as shown at 9 to form a pair of co-acting resilient jaws 10 and 11. The outer ends of the jaws are formed with outwardly projecting lips 12 which are spaced from each other to provide an entrance 13 leading to the recess. The ends of the plate opposite from the jaws are formed with outwardly extending flanges 14 and 15. The catch is anchored to a cabinet shelf 16 by making a vertical saw cut or slot 17 in the front edge of the shelf and forming a substantially rectangular shaped counter sink 18 in the upper surface of the shelf which is bisected by the saw cut. The saw cut or slot 17 is of a width to tightly fit the pair of plates 5 and 6 therein by driving the plates edgewise in the slot and driving the flanges 14 and 15 in the counter sink 18.

Figure 1:
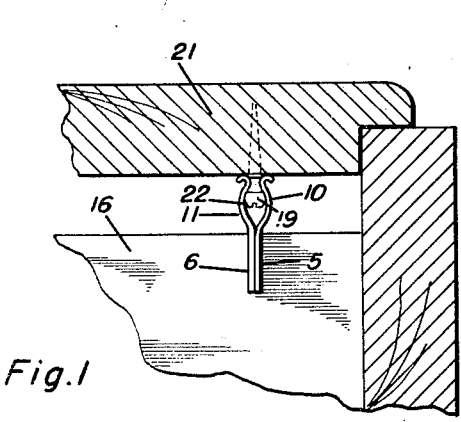
Figure 1 is a bottom plan view.
Figure 3:
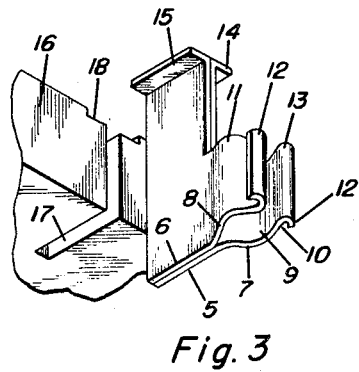
Figure 3 is an enlarged perspective view of the catch prior to anchoring in the saw cut of the shelf.
Figure 4:
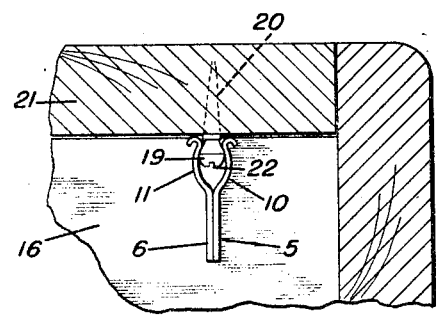
Figure 4 is a bottom plan view of a modified anchoring arrangement.

The jaws may project forwardly of the front edge of the shelf, as shown in Figures 1 and 2, or the jaws may underlie the shelf and with the lips 12 flush with the front edge thereof, as shown in Figure 4.

In either position the catch will be frictionally anchored or may be cemented in the saw cut or slot 17 and the head 19 of a threaded stud 20 which is secured to the inner surface of a door 21 is adapted to enter the jaws 10 and 11 to secure the door in closed position.

The head 19 is provided with a conventional slot 22 therein whereby a screw driver may be used to screw the stud 20 into the door 21. The head 19 may also be provided with a nail hole 23 whereby a nail, nail set or other similar object may be used to drive the stud 20 into the door 21 without damaging the head 19.

The instant device may also be used as a support for tools in a workshop, tool boxes and the like. In such an instance the jaws are mounted on the object which is to form the support and the tool or object to be supported is placed between the jaws to be frictionally engaged thereby.

From the foregoing, the construction and operation of the device will be readily understood and further explanation is believed to be unnecessary. However, since numerous modifications and changes will occur to those skilled in the art, it is not desired to limit the invention to the exact construction shown and described, and accordingly all suitable modifications and equivalents may be resorted to, falling within the scope of the appended claim.

What is claimed as new is as follows:

In a door catch, a pair of L-shaped plates secured to each other in confronting relation and adapted for embedding at their upper end portions in a supporting structure and with the lower end portions of said plates projecting below the structure, a pair of co-acting resilient jaws integrally formed with the lower projecting end portions of the plates, said structure having a counter-sink in its upper surface, and outwardly extending flanges at the upper end portions of the respective plates and fitted in said counter-sink.

References Cited in the file of this patent

UNITED STATES PATENTS

| 316,062 | Riessner | Apr. 21, 1885 |
| 1,566,632 | Swenson | Dec. 22, 1925 |

UNITED STATES PATENTS

| 85,699 | Switzerland | July 1, 1920 |
| 150,273 | Austria | July 26, 1937 |
| 632,972 | Germany | July 17, 1936 |